United States Patent
Stenbacka (10) Patent No.: US 11,863,866 B2
(45) Date of Patent: Jan. 2, 2024

(54) HOUSING FOR AN INTERMEDIATE SIGNAL TRANSMISSION UNIT AND AN INTERMEDIATE SIGNAL TRANSMISSION UNIT

(71) Applicant: PROFOTO AKTIEBOLAG, Sundbyberg (SE)

(72) Inventor: Emil Stenbacka, Stockholm (SE)

(73) Assignee: Profoto Aktiebolag, Sundbyberg (SE)

( * ) Notice: Subject to any disclaimer, the term of this patent is extended or adjusted under 35 U.S.C. 154(b) by 236 days.

(21) Appl. No.: 17/427,304

(22) PCT Filed: Jan. 28, 2020

(86) PCT No.: PCT/SE2020/050070
§ 371 (c)(1),
(2) Date: Jul. 30, 2021

(87) PCT Pub. No.: WO2020/159422
PCT Pub. Date: Aug. 6, 2020

(65) Prior Publication Data
US 2022/0150407 A1     May 12, 2022

(30) Foreign Application Priority Data
Feb. 1, 2019    (SE) .................................... 1950126-1

(51) Int. Cl.
*H04N 23/667*        (2023.01)
*G08B 6/00*          (2006.01)
(Continued)

(52) U.S. Cl.
CPC .............. *H04N 23/667* (2023.01); *G08B 6/00* (2013.01); *H04N 23/51* (2023.01); *H04N 23/56* (2023.01)

(58) Field of Classification Search
CPC ...... H04N 23/51; H04N 23/667; H04N 23/56; H04N 23/60; G03B 15/05; G03B 2206/00;
(Continued)

(56) References Cited

U.S. PATENT DOCUMENTS 4,351,200 A * 9/1982 McElroy .............. H01H 43/065
74/568 T
4,373,793 A   2/1983 Taniguchi et al.
(Continued)

FOREIGN PATENT DOCUMENTS

CA    2967455 A1    11/2017
CN    1509130 A     6/2004
(Continued)

OTHER PUBLICATIONS

Extended European Search Report for European Patent Application No. 20749018.6, dated Sep. 27, 2022, in 9 pages.
(Continued)

*Primary Examiner* — Pritham D Prabhakher
(74) *Attorney, Agent, or Firm* — Knobbe, Martens, Olson & Bear, LLP (57) ABSTRACT

A housing for an intermediate signal transmission unit for wireless communication between a camera and at least one remote flash device, the housing comprising a first housing part and a second housing part which are connected. The second housing part is configured to accommodate signal transmission components of the intermediate signal transmission unit. The housing also comprising a connector by means of which the housing is physically connectable to a camera, said connector being arranged on the second housing part. The first housing part is displaceable in relation to the second housing part, and the first housing part comprises at least one actuator configured to control at least one switch,
(Continued)

said switch being part of the signal transmission components and located in the second housing part. The at least one actuator is movable between at least two positions in relation to the second housing part, comprising a first position in which the actuator can control the switch to be in a first state, and a second position in which the actuator can control the switch to be in a second state, by means of displacing the first housing part and the actuator in relation to the second housing part. An intermediate signal transmission unit comprising a housing and signal transmission components is also described.

17 Claims, 4 Drawing Sheets

(51) Int. Cl.
H04N 23/51 (2023.01)
H04N 23/56 (2023.01)

(58) Field of Classification Search
CPC .... G03B 2215/0517; G03B 2215/0557; G08B 6/00
USPC ......................................................... 348/370
See application file for complete search history.

(56) References Cited

U.S. PATENT DOCUMENTS

| | | |
|---|---|---|
| 5,452,048 A | 9/1995 | Edgar |
| 6,178,296 B1 | 1/2001 | Kojima |
| 6,404,987 B1 | 6/2002 | Fukui |
| 7,420,613 B2 | 9/2008 | Lee |
| 7,583,297 B2 | 9/2009 | Yamada |
| 7,697,062 B2 | 4/2010 | Wernersson |
| 7,756,354 B2 | 7/2010 | Washisu |
| 7,783,188 B2 | 8/2010 | Clark |
| 7,986,853 B2 | 7/2011 | Washisu |
| 8,160,435 B2* | 4/2012 | Okubo .................. G03B 15/05 396/201 |
| 8,400,773 B2 | 3/2013 | Geldmacher |
| 8,854,536 B2 | 10/2014 | Ogasawara |
| 8,964,062 B1 | 2/2015 | Neglur |
| 9,001,226 B1 | 4/2015 | Ng et al. |
| 9,531,961 B2 | 12/2016 | Rivard et al. |
| 9,635,233 B2* | 4/2017 | Clark ..................... H04N 23/56 |
| 9,819,849 B1 | 11/2017 | Rivard et al. |
| 9,912,928 B2 | 3/2018 | Rivard et al. |
| 9,917,995 B2 | 3/2018 | Falk |
| 9,998,721 B2 | 6/2018 | Rivard et al. |
| 10,044,941 B2 | 8/2018 | Falk |
| 10,110,870 B2 | 10/2018 | Rivard et al. |
| 10,129,514 B2 | 11/2018 | Rivard et al. |
| 10,149,373 B2 | 12/2018 | Adenau |
| 10,200,663 B2 | 2/2019 | Saito et al. |
| 10,375,315 B2 | 8/2019 | Falk |
| 10,375,369 B2 | 8/2019 | Rivard et al. |
| 10,455,130 B2 | 10/2019 | Falk |
| 10,469,714 B2 | 11/2019 | Rivard et al. |
| 10,477,077 B2 | 11/2019 | Rivard et al. |
| 10,595,386 B2 | 3/2020 | Adenau |
| 10,630,880 B2* | 4/2020 | Suzuki ................... H04N 23/74 |
| 10,732,485 B2* | 8/2020 | Tamura .................. H04N 23/73 |
| 10,742,733 B2* | 8/2020 | Scurrell ................. H04W 4/80 |
| 10,742,892 B1* | 8/2020 | Le ......................... H04N 23/741 |
| 10,820,393 B2 | 10/2020 | Adenau |
| 10,904,505 B2 | 1/2021 | Rivard et al. |
| 11,356,647 B2* | 6/2022 | Rivard ................... H04N 23/56 |
| 11,375,085 B2* | 6/2022 | Rivard ............... H04N 5/44504 |
| 2004/0239767 A1 | 12/2004 | Stavely et al. |
| 2007/0019421 A1 | 1/2007 | Kregness et al. |
| 2007/0025270 A1 | 2/2007 | Sylvain |
| 2007/0025720 A1 | 2/2007 | Raskar et al. |
| 2007/0070206 A1 | 3/2007 | Clark |
| 2008/0298793 A1 | 12/2008 | Clark |
| 2009/0129634 A1 | 5/2009 | De Waele |
| 2009/0135262 A1 | 5/2009 | Ogasawara |
| 2009/0160970 A1 | 6/2009 | Fredlund et al. |
| 2009/0196595 A1* | 8/2009 | Okubo .................. G03B 15/05 396/287 |
| 2009/0303594 A1 | 12/2009 | Lim et al. |
| 2010/0008658 A1 | 1/2010 | King |
| 2010/0026853 A1 | 2/2010 | Mokhnatyuk |
| 2010/0124041 A1 | 5/2010 | Druchinin |
| 2010/0124412 A1 | 5/2010 | King |
| 2010/0202767 A1 | 8/2010 | Shirakawa |
| 2010/0290771 A1 | 11/2010 | Clark |
| 2011/0123185 A1 | 5/2011 | Clark |
| 2011/0129207 A1 | 6/2011 | King et al. |
| 2011/0157408 A1 | 6/2011 | Steinberg et al. |
| 2011/0188845 A1* | 8/2011 | Hanayama ............. H04N 23/74 396/155 |
| 2012/0033959 A1 | 2/2012 | King |
| 2012/0044380 A1 | 2/2012 | Imai |
| 2012/0045193 A1 | 2/2012 | King |
| 2012/0127334 A1 | 5/2012 | Imai |
| 2012/0140088 A1 | 6/2012 | Clark |
| 2012/0177352 A1 | 7/2012 | Pillman et al. |
| 2012/0321287 A1 | 12/2012 | King et al. |
| 2013/0069559 A1* | 3/2013 | Li .......................... G03B 15/05 315/294 |
| 2013/0128101 A1 | 5/2013 | Midorikawa |
| 2013/0300894 A1 | 11/2013 | Imai et al. |
| 2014/0016026 A1 | 1/2014 | Wolfe et al. |
| 2014/0347554 A1* | 11/2014 | Shirakawa ............. H04N 23/56 348/370 |
| 2015/0116586 A1 | 4/2015 | Mahowald |
| 2015/0262024 A1 | 9/2015 | Braithwaite et al. |
| 2016/0021292 A1 | 1/2016 | Zhang |
| 2016/0198078 A1* | 7/2016 | Falk .................. H04M 1/72412 348/371 |
| 2016/0232672 A1 | 8/2016 | Rezaiifar |
| 2016/0248960 A1 | 8/2016 | Falk |
| 2017/0094240 A1* | 3/2017 | Saito ....................... H04N 23/56 |
| 2017/0223253 A1* | 8/2017 | Clark ...................... H04N 23/73 |
| 2017/0332131 A1 | 11/2017 | Opsenica et al. |
| 2017/0374265 A1 | 12/2017 | Finlow-Bates |
| 2018/0206310 A1* | 7/2018 | Adenau .................. H03K 17/97 |
| 2018/0343374 A1 | 11/2018 | Tamura |
| 2018/0359411 A1 | 12/2018 | Kohstall et al. |
| 2019/0037018 A1 | 1/2019 | Scurrell et al. |
| 2019/0124252 A1 | 4/2019 | Suzuki |
| 2020/0059575 A1 | 2/2020 | Rivard et al. |
| 2020/0267299 A1 | 8/2020 | Le et al. |
| 2021/0274142 A1 | 9/2021 | Rivard et al. |
| 2022/0053120 A1 | 2/2022 | Ridderstrom |
| 2022/0053121 A1 | 2/2022 | Falk et al. |

FOREIGN PATENT DOCUMENTS

| | | |
|---|---|---|
| CN | 1574899 A | 2/2005 |
| CN | 1645914 A | 7/2005 |
| CN | 1704835 A | 12/2005 |
| CN | 101048796 A | 10/2007 |
| CN | 201083935 Y | 7/2008 |
| CN | 101536493 A | 9/2009 |
| CN | 101592972 A | 12/2009 |
| CN | 102143320 A | 8/2011 |
| CN | 201936103 U | 8/2011 |
| CN | 102447834 A | 5/2012 |
| CN | 102879977 A | 1/2013 |
| CN | 103076708 A | 5/2013 |
| CN | 103297684 A | 9/2013 |
| CN | 203407048 U | 1/2014 |
| CN | 105556384 A | 5/2016 |
| CN | 105579901 A | 5/2016 |
| CN | 105635599 A | 6/2016 |
| CN | 105657281 A | 6/2016 |
| CN | 106027912 A | 10/2016 |
| CN | 106210550 A | 12/2016 |
| CN | 106576155 A | 4/2017 |
| CN | 107079193 A | 8/2017 |

(56) References Cited

FOREIGN PATENT DOCUMENTS

| | | |
|---|---|---|
| CN | 107209940 A | 9/2017 |
| CN | 107395997 A | 11/2017 |
| CN | 107534738 A | 1/2018 |
| CN | 108012134 A | 5/2018 |
| CN | 208418639 U | 1/2019 |
| CN | 109644224 A | 4/2019 |
| CN | 113454530 A | 9/2021 |
| EP | 1278373 A2 | 1/2003 |
| EP | 3047333 A1 | 7/2016 |
| EP | 3047334 A1 | 7/2016 |
| GB | 2154341 | 9/1985 |
| GB | 2477406 | 8/2011 |
| JP | S 63-276039 A | 11/1988 |
| JP | 2000-338573 A | 12/2000 |
| JP | 2004-029184 A | 1/2004 |
| JP | 2017-121029 A | 7/2017 |
| KR | 10-2009-0040427 A | 4/2009 |
| KR | 10-1414032 B1 | 7/2014 |
| TW | 200900830 A | 1/2009 |
| WO | WO 2015/038047 A1 | 3/2015 |
| WO | WO 2015/038061 A1 | 3/2015 |
| WO | WO 2015/047150 A1 | 4/2015 |
| WO | WO 2017/030777 A1 | 2/2017 |
| WO | WO 2017/134933 A1 | 8/2017 |
| WO | WO 2018/005765 A1 | 1/2018 |
| WO | WO 2018/017625 A1 | 1/2018 |
| WO | WO 2019/022243 A1 | 1/2019 |

OTHER PUBLICATIONS

Extended European Search Report for European Patent Application No. 19861059.4, dated Apr. 28, 2022, in 8 pages.
International Search Report and Written Opinion of the International Searching Authority for International Application No. PCT/SE2019/050829, dated Nov. 18, 2019, in 19 pages.
International Search Report and Written Opinion of the International Searching Authority for International Application No. PCT/SE2019/050850, dated Nov. 26, 2019, in 17 pages.
International Search Report for International Application No. PCT/SE2014/051072, dated Jan. 9, 2015, in 5 pages.
International Written Opinion for International Application No. PCT/SE2014/051072, dated Jan. 9, 2015, in 5 pages.
International Preliminary Report on Patentability for International Application No. PCT/SE2014/051072, dated Sep. 8, 2015, in 6 pages.
Extended European Search Report in Patent Application No. 14844738.6, dated May 2, 2017 in 10 pages.
International Search Report for International Application No. PCT/SE2014/050224, dated Nov. 14, 2014, in 5 pages.
International Written Opinion for International Application No. PCT/SE2014/050224, dated Nov. 14, 2014, in 5 pages.
International Preliminary Report on Patentability for International Application No. PCT/SE2014/050224, dated Aug. 14, 2015, in 12 pages.
Extended European Search Report in Patent Application No. 14844826.9, dated Apr. 13, 2017, in 8 pages.
International Search Report for International Application No. PCT/SE2014/050225, dated May 27, 2014, in 5 pages.
International Written Opinion for International Application No. PCT/SE2014/050225, dated May 27, 2014, in 5 pages.
International Preliminary Report on Patentability for International Application No. PCT/SE2014/050225, dated Sep. 8, 2015, in 6 pages.
International Search Report and Written Opinion of the International Searching Authority for International Application No. PCT/SE2020/050070, dated Aug. 4, 2020, in 12 pages.
Swedish Search Report for Swedish Patent Application No. 1950126-1, dated Aug. 7, 2019, in 12 pages.
Extended European Search Report for European Patent Application No. 19858764.4, dated May 10, 2022, in 10 pages.

* cited by examiner

HOUSING FOR AN INTERMEDIATE SIGNAL TRANSMISSION UNIT AND AN INTERMEDIATE SIGNAL TRANSMISSION UNIT

CROSS-REFERENCE TO RELATED APPLICATIONS

This application is the U.S. National Phase under 35 U.S.C. § 371 of International Application PCT/SE2020/050070, filed Jan. 28, 2020, which claims priority to SE Application No. 1950126-1, filed Feb. 1, 2019, the entire contents of each of which are incorporated by reference herein and made a part of this specification.

TECHNICAL FIELD

The present disclosure relates to the field of intermediate signal transmission units for wireless communication between a camera and at least one remote flash device. In particular it relates to a housing for an intermediate signal transmission unit and an intermediate signal transmission unit comprising a housing.

BACKGROUND

Photoflash units, also called flash devices, flash lighting devices etc., of various kinds are commonly used in photography for producing a flash of artificial light to help illuminate a scene, a scene which would otherwise be perceived as underexposed, i.e. too dark, to the viewer of a captured picture of the scene. Other uses of flashes are capturing quickly moving objects or changing the quality of light. Most current flash lighting devices are electronic and have been developed through xenon-based flash devices to state of the art light emitting diode (LED) flash devices. Modern cameras often activate connected flash lighting devices automatically.

In order to utilize various commonly used flash lighting devices, camera bodies are according to internationally accepted standards equipped with a so-called hot shoe accessory connector. A flash lighting device may be connected, directly or through an extension cord, to the hot shoe connector. The emission of flash light from the lighting device can be synchronized to an image acquisition by the camera by a synchronization signal received by the lighting device. In prior art camera systems, this synchronization signal is transmitted from the camera to the flash device via its connection to the hot shoe connector.

In modern applications of camera systems and in studio equipment for photography, a remote flash lighting device can be triggered by wireless synchronization, which has been realized using optical, such as infrared, and radio frequency communications to the remote flash device. Wireless synchronization typically involves connecting a separate, intermediate signal transmission unit to the hot shoe of the camera, for bi-directionally exchanging signals with the camera. The intermediate signal transmission unit further includes a radio transmitter that sends a signal to a radio receiver provided on the remote flash device, in order to activate the remote flash device in synchronization with image acquisition by the camera. Such a radio frequency communication systems may also include a transmitter at the remote flash device for sending a confirmation signal back to the camera side radio, indicating that the flash-side radio has successfully activated the flash lighting device in use.

Examples of such systems and intermediate signal transmission units are described in WO 2015038047 and WO 2015038061.

An intermediate signal transmission unit often comprises a user interface with a number of buttons connected to switches that control a set of functions of the intermediate signal transmission unit itself and also functions of the remote flash device. The most common functions are on/off of the intermediate signal transmission unit, auto-mode of the remote flash device e.g. by TTL of the camera, manual mode of the remote flash device. Such buttons may be physical buttons or buttons on a touch screen. An example of how a user interface of an intermediate signal transmission device can be designed is shown in U.S. Pat. No. 8,824,881, showing physical buttons and a display screen.

SUMMARY

The present disclosure is based on the realisation that it would be an advantage to have a more simplified intermediate signal transmission device that would be easy to operate and preferably without having to look at buttons in order to operate the device. A problem to be solved is thus how to obtain an intermediate signal transmission device that can provide this advantage and possibly also other advantages.

Hereby is disclosed a housing for an intermediate signal transmission unit for wireless communication between a camera and at least one remote flash device, the housing comprising
  a first housing part and a second housing part which are connected, said second housing part being configured to accommodate signal transmission components of the intermediate signal transmission unit,
  a connector by means of which the housing is physically connectable to a camera, said connector being arranged on the second housing part,
  wherein
  the first housing part is displaceable in relation to the second housing part,
  the first housing part comprises at least one actuator configured to control at least one switch, said switch being part of the signal transmission components and located in the second housing part, and
  the at least one actuator is movable between at least two positions in relation to the second housing part, comprising a first position in which the actuator can control the switch to be in a first state and a second position in which the actuator can control the switch to be in a second state, by means of displacing the first housing part and the actuator in relation to the second housing part.

By providing a housing for an intermediate signal transmission device that makes it possible to control switches of the intermediate signal transmission device by a simple relative movement of two housing parts is obtained the advantage that there is no need for any external buttons, should it be mechanical or on a touch screen, on the device in order to switch on or off a certain switch of the device. This makes it possible to manoeuvre and control the device without having to look at buttons or touch screen. A person taking a photo can e.g. continue to look through the viewfinder of the camera. Moreover, the housing will make the intermediate signal transmission device less sensitive to inadvertent pushing of buttons and it may be possible to have a smooth external surface. The referred to positions of the actuator can e.g. be on/off positions in which the switch is activated or de-activated. The relative movement comprises that the first housing part is configured to be displaceable in relation to the second housing part when the two housing parts are connected, i.e. mounted together to form the housing.

The actuator may comprise a protrusion located on an internal surface of the first housing part. This is a very simple type of actuator that easily can be produced as an integral part of the housing wall.

The housing may comprise a tactile indicator device configured to give tactile feedback to a user, which tactile feedback is associated with the positions of the actuator. This will further improve the advantages mentioned above, e.g. the possibility to manoeuvre and control the device without having to look at buttons or touch screen. This also allows for a more intuitive handling of the device when the user senses a tactile feedback upon reaching e.g. an off position or on position.

The tactile indicator device may comprise
  recesses located in an internal surface of the first housing part, the number of recesses corresponding to at least the number of positions of the actuator,
  a spring loaded ball or cylinder located in or on the second housing part, configured for cooperation with the recesses, such that the ball/cylinder is pressed into a first recess by means of the spring, when the actuator is in a first position, and is configured to move along the internal surface of the first housing part during displacement of the first housing part in relation to the second housing part, until it reaches a second recess being located to correspond to the actuator being in a second position.

This is an example of a tactile indicator device of a useful design. However, modifications and also other types of tactile indicator devices are possible. For example, instead of a ball or cylinder it may be possible to have a corresponding member having at least a partly spherical or cylindrical surface configured to cooperate with the recesses and being movable along the internal surface of the first housing part. Other modifications may also include to have the spring-loaded ball/cylinder or corresponding element arranged on the internal wall surface of the first housing part and recesses arranged in the second housing part.

The at least one actuator may be movable between three positions in relation to the second housing part, wherein a third position is a position in which the actuator can control a second switch. This will increase the usability of the housing. In addition to e.g. two positions representing on and off of a first switch, it will be possible to have a third position representing e.g. an on position of a second switch.

The second housing part may comprise an USB-port. There may be different uses for a USB-port. For example it may be used for connection to a rechargeable battery of the intermediate signal transmission device.

The function that the first housing part is displaceable in relation to the second housing part may be obtained, for example, by having a connection between the first housing part and the second housing part that enables the first housing part to be slideable in relation to the second housing part. This can be achieved in different ways. The first housing part may have a first contact surface and the second housing part may have a second contact surface, and said first and second contact surfaces are configured have corresponding shapes and are arranged to face each other when the first and second housing part are connected, such that the first contact surface is slideable along the second contact surface when the first housing part is displaced in relation to the second housing part. The respective contact surfaces may e.g. be contact surfaces that are at least partly annular or cylindrical such that a relative rotational movement can be obtained, or they may have a longitudinal shape such that a relative longitudinal movement can be obtained.

According to one example, the housing may comprise an intermediate connection part by means of which the first housing part is movably connected to the second housing part and thereby displaceable in relation to the second housing part.

As an example, the intermediate connection part may be movably mounted to the second housing part, the first housing part may comprise resilient protruding snap connectors, and the intermediate connection part may comprise corresponding connector recesses configured to receive a respective snap connector upon connection of the first housing part to the second housing part. In other words, the first housing part will be connected to the second housing part via the intermediate connection part. The intermediate connection part will then be locked to the first housing part and form a unit that is movable in relation to the second housing part by means of the intermediate connection part being movably mounted to the second housing part. The above mentioned first contact surface will then be a contact surface of the intermediate connection part. There may also be stop members arranged to limit the relative movement between the first housing part and the second housing part. Such stop members may e.g. be arranged in the first housing part.

As an alternative, the first housing part may comprise resilient snap connectors protruding inwards from an internal surface of the first housing part, and the second housing part may comprise corresponding connector recesses configured to receive a respective snap connector upon connection of the first housing part to the second housing part, and each connector recess having a length that exceeds the length of a corresponding snap connector, whereby the snap connectors are displaceable in the connector recesses and the first housing part is displaceable in relation to the second housing.

Other types of connection arrangements between the first housing part and the second housing part are also conceivable.

The first housing part and the second housing part may have a cylindrical shape when connected and the first housing part may then be displaceable in relation to the second housing part by means of a rotational movement. This has the advantage that the housing may be configured as a knob, that the user can rotate in order to obtain different positions that represent different functions or operation modes of the intermediate signal transmission unit and the remote flash device. Such a knob can also be made relatively big in order to provide a good grip for the user. A cylindrical shape is also advantageous since there will be less risk that other objects get inadvertently caught on the housing as compared to e.g. rectangular housings having protruding corner edges. When the housing parts have a cylindrical shape, the intermediate connection part may be shaped as a ring arranged in e.g. an annular groove provided in the circumferential external surface of the second housing part, and slideable/rotatable in said groove. The connector recesses configured to receive the snap connectors of the first housing part are then provided in e.g. a circumferential external surface of the ring.

The housing may comprise a locking mechanism configured to lock the connector to the camera when connected to the camera, and a release button for releasing the locking mechanism. This prevents that the intermediate signal transmission unit can be inadvertently removed from the camera. It is also an advantage if the intermediate signal transmission unit can be properly locked and fixed to the camera in order to prevent it from moving in relation to the camera when rotating the upper, first housing part. This will also make it possible to make the intermediate signal transmission unit smaller.

Hereby is also disclosed an intermediate signal transmission unit configured to provide wireless communication between a camera and at least one remote flash device, the unit comprising a housing in accordance with any claim describing such a housing and as described above, and signal transmission components accommodated in the housing and including a signal transmitter configured to send control signals to the at least one remote flash device, wherein the connector is configured to enable bi-directional exchange of signals between the signal transmission components of the intermediate signal transmission unit and the camera, the signal transmission components comprise at least one switch configured to control the communication between the camera and the at least one remote flash device by controlling operation modes of the intermediate signal transmission unit, and which switch can be controlled by means of the actuator when the first housing part is displaced in relation to the second housing part such that when the actuator is in a first position the switch is in a first state wherein the intermediate signal transmission unit functions in a first operation mode and when the actuator is in a second position the switch is in a second state wherein the intermediate signal transmission unit functions in a second operation mode.

The advantages of the intermediate signal transmission unit correspond to the advantages described above in relation to the housing.

The signal transmission components may comprise a first switch and a second switch, both configured to control the communication between the camera and the at least one remote flash device, wherein the first switch controls one operation mode of the intermediate signal transmission unit, and the second switch controls another operation mode of the intermediate signal transmission unit. The first switch and the second switch may be controlled separately by the actuator when the first housing part is displaced in relation to the second housing part.

As an example, a first switch may be configured to be in a first state corresponding to the first operation mode when the actuator is in the first position and in a second state corresponding to the second operation mode when the actuator is in the second position, and the second switch may be configured to be in a first state corresponding to a third operation mode when the actuator is in a third position, wherein said positions are obtainable by displacing the first housing part in relation to the second housing part.

Both the first switch and the second switch may be configured to be in a respective second disconnected state corresponding to the second operation mode when the actuator is in the second position. The second operation mode may thus be a default mode in which none of the switches are actuated by the actuator and therefore not connected.

The three operation modes may e.g. comprise one mode that is an off mode in which the intermediate signal transmission unit does not transmit any signals to the flash device, one mode that is a manual mode in which the flash device is controllable manually, and one mode that is an auto-mode in which the flash device is controlled automatically by the camera. This allows the user to trigger the flash light from the top of the camera with only three settings, off, auto and manual. In prior art manual mode is usually only possible to choose from the remote flash device itself. Naturally, it would be possible to have only two modes, e.g. a manual mode and an auto mode. It would also be possible to have additional modes of operation and additional switches, as well as other, different modes of operation.

According to one example, the first operation mode may be an off mode in which the intermediate signal transmission unit does not transmit any signals to the flash device, the third operation mode may be a manual mode in which the flash device is controllable manually, and the second operation mode may be an auto-mode obtained when the actuator is in the second position and in which the flash device is controlled automatically by the camera.

The intermediate signal transmission unit may comprise a re-chargeable battery, which may be chargeable via an USB-port provided in the housing. This can e.g. be a Latium polymer battery.

The intermediate signal transmission unit may comprises a status indicator indicating the status of at least one function of the intermediate signal transmission unit, and which status indication is visible from outside of the housing. This may be configured to show the status of e.g. one or more of the following functions:

connection to Blue tooth
battery is fully charged
low battery
critically low battery
charging of battery
status: ready for operation The status may be indicated by a light emitted to the outside of the housing, and the light may have different colours depending on the different functions. E.g. a LED light device may be arranged in the housing.

The housing allows for the intermediate signal transmission device to be fairly small and light while at the same time the actual grip element can be fairly big since the entire upper part of the housing, i.e. the movable first part of the housing, can be designed as a knob that can be turned or moved e.g. by sliding. Thus it will be easy to handle also for persons with big hands and persons having problems related to reduced finger gripping capability.

By the expression that the actuator can control a switch is intended that the actuator can actuate or operate the switch. E.g. the actuator can actuate/operate the switch such that in a first state or position of the switch, the switch is in a connected state in which a function controlled by the switch activated. When the actuator actuates or operates the switch to be in a second state or position, the switch is disconnected such that the mentioned function is no longer activated. It is possible that instead another function is activated and this can e.g. be a default function.

The intermediate signal transmission device as such may be configured to transmit radio signal, blue tooth, or any other suitable type of signals.

Further features and advantages will also become apparent from the following detailed description of embodiments and examples.

BRIEF DESCRIPTION OF THE DRAWINGS

In the following detailed description, reference will be made to the enclosed schematic drawings illustrating different examples according to the present disclosure, and in which.

Elements that are the same or represent corresponding or equivalent elements have been given the same reference numbers in the different figures.

DETAILED DESCRIPTION

Figure 1:
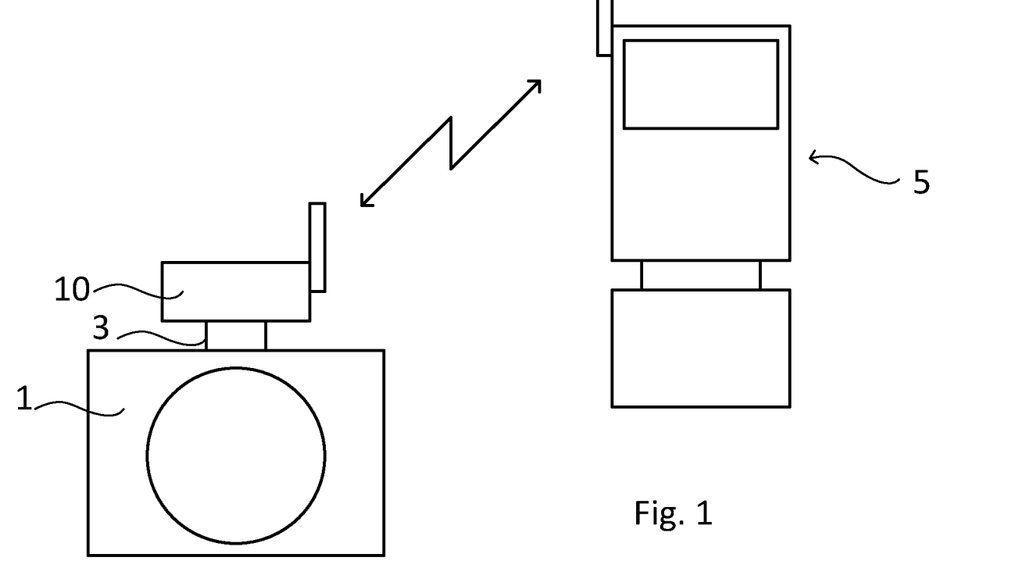
FIG. 1 schematically illustrates a camera system.

In FIG. 1 is schematically illustrated an example of a camera system comprising a camera 1, an intermediate signal transmission unit 10 and a remote flash device 5. The camera 1 comprises a connector 3, e.g. a hot shoe, to which the intermediate signal transmission unit 10 is connectable.

FIGS. 2a-4b illustrate schematically an example of a housing 30 for an intermediate signal transmission unit for wireless communication between a camera and at least one remote flash device. The housing 30 comprises a first housing part 40 and a second housing part 50 which are connected. The second housing part 50 is configured to accommodate signal transmission components of the intermediate signal transmission unit. The housing 30 further comprises a connector 60 by means of which the housing is physically connectable to a camera, and said connector is arranged on the second housing part 50. The connector can provide both mechanical connection and electric/electronic connection between the camera and the housing and any signal transmission components in the housing.

The first housing part 40 is displaceable in relation to the second housing part 50. The first housing part 40 comprises at least one actuator 41 configured to control at least one switch 70, 71 that is part of the signal transmission components that are accommodated in the second housing part 50. The at least one actuator 41 is movable between at least two positions in relation to the second housing part 50, comprising a first position in which the actuator can control the switch 70, 71 to be in a first state and a second position in which the actuator can control the switch 70,71 to be in a second state, by means of displacing the first housing part 40 and the actuator 41 in relation to the second housing part 50.

Figure 2A:
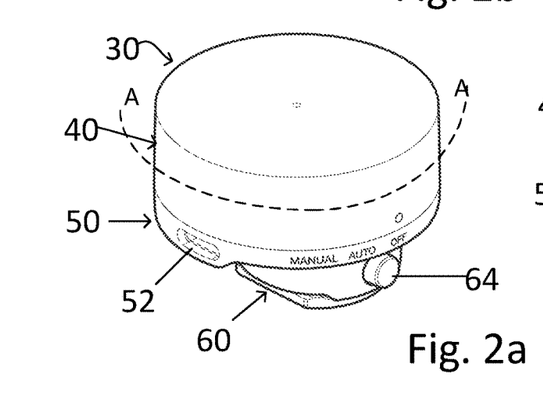
FIG. 2a illustrates schematically a housing for an intermediate signal transmission unit when in a first position.
Figure 2B:
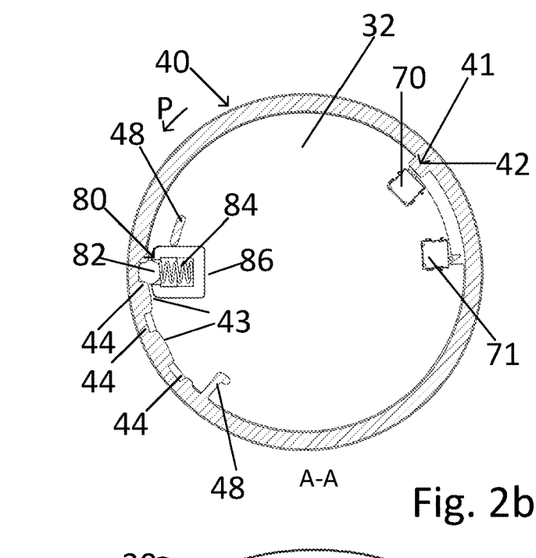
FIG. 2b shows a cross section, along A-A, seen from above, of the housing when in a first position.
Figure 3A:
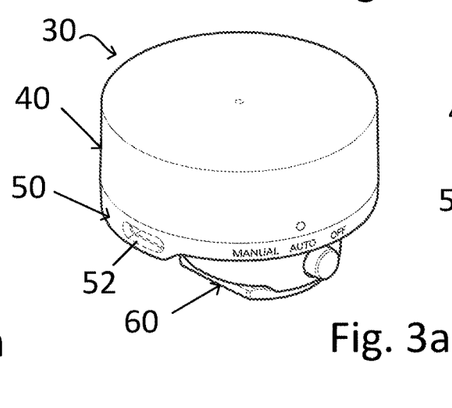
FIG. 3a illustrates schematically a housing for an intermediate signal transmission unit when in a second position.
Figure 3B:
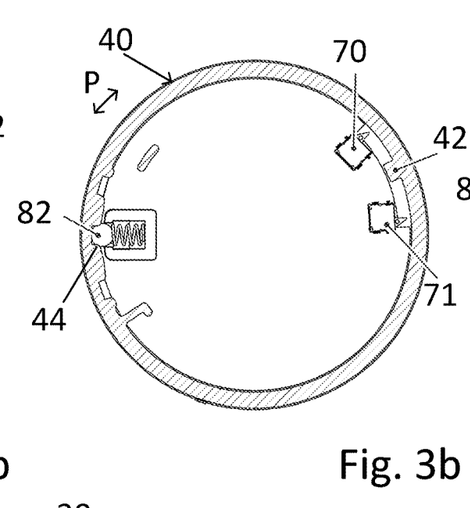
FIG. 3b shows a cross section, seen from above, of the housing in a second position.
Figure 4A:
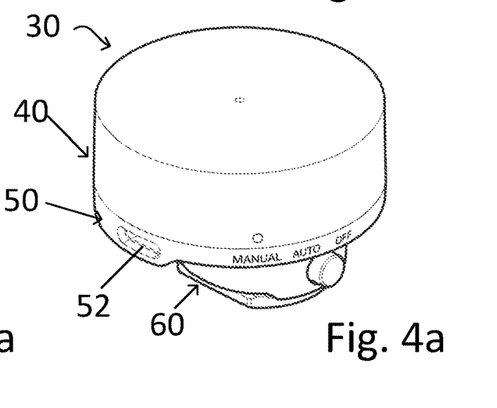
FIG. 4a illustrates schematically a housing for an intermediate signal transmission unit when in a third position.
Figure 4B:
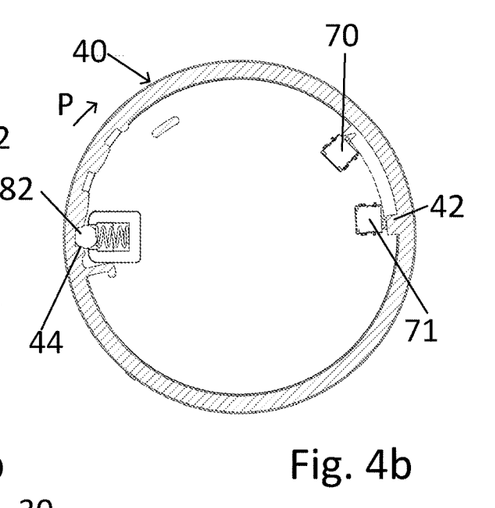
FIG. 4b shows a cross section, seen from above, of the housing in a third position.

The cross section in FIG. 2b is a cross sections of the upper, first housing part, as seen from above, along A-A as shown in FIG. 2a. The cross sections in FIGS. 3b and 4b are corresponding cross section with the first housing part in other positions. In the interior of the housing 30, when the first and second housing parts are mounted together, there is a cavity 32 in which the signal transmission components of an intermediate signal transmission unit can be accommodated.

The actuator 41 may comprise a protrusion 42 located on an internal surface 43 of the first housing part 40.

The housing 30 may comprise a tactile indicator device 80 configured to give tactile feedback to a user, which tactile feedback is associated with the positions of the actuator 41.

The tactile indicator device 80 may comprise recesses 44 located in an internal surface 43 of the first housing part 40, the number of recesses corresponding to at least the number of positions of the actuator 41. The tactile indicator device 80 may comprise a spring loaded ball or cylinder 82 located in or on the second housing part 50, and configured for cooperation with the recesses 44, such that the ball/cylinder is pressed into a first recess 44 by means of the spring 84, when the actuator 42 is in a first position. The spring-loaded ball or cylinder 82 is further configured to move along the internal surface 43 of the first housing part 40 during displacement of the first housing part 40 in relation to the second housing part 50, until it reaches a second recess 44 being located to correspond to the actuator 41 being in a second position.

The at least one actuator 41 may be movable between three positions in relation to the second housing part 50, wherein a third position is a position in which the actuator can control a second switch 71. FIGS. 2a-4b illustrate examples of three different positions of the first housing part in relation to the second housing part, as will be further described later.

The second housing part 50 may comprise a USB-port 52.

Figure 6:
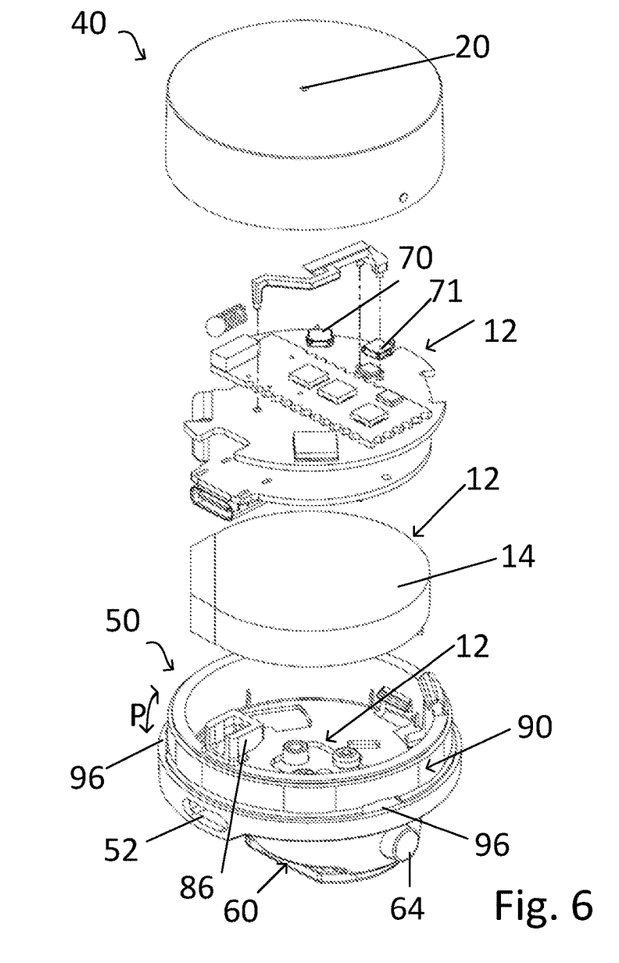
FIG. 6 is an exploded view of an example a housing and of an intermediate signal transmission unit.

The housing 30 may comprise an intermediate connection part 90 by means of which the first housing part 40 is movably connected to the second housing part 50 and thereby displaceable in relation to the second housing part 50. An example and a view of the intermediate connection part 90 is shown in FIG. 6.

The movable connection of the first housing part 40 to the second housing part 50 may be achieved by the intermediate connection part 90 being movably mounted to the second housing part, in combination with the first housing part 40 comprising resilient protruding snap connectors 46, and the intermediate connection part comprising corresponding connector recesses 96 configured to receive a respective snap connector 46 upon connection of the first housing part 40 to the second housing part 50. The intermediate connection part 90 will then be locked to the first housing part 40. The intermediate connection part 90 and the first housing part 40 will then form a unit that is movable in relation to the second housing part 50 by means of the intermediate connection part 90 being movably mounted to the second housing part 50. This is shown in FIG. 6 by the arrow P.

The first housing part 40 and the second housing part 50 may have a cylindrical shape when connected and the first housing part 40 may be displaceable in relation to the second housing part 50 by means of a rotational movement.

The housing 30 may comprise a locking mechanism 62 configured to lock the connector 60 to the camera when connected to the camera, and a release button 64 for releasing the locking mechanism.

Figure 7A:
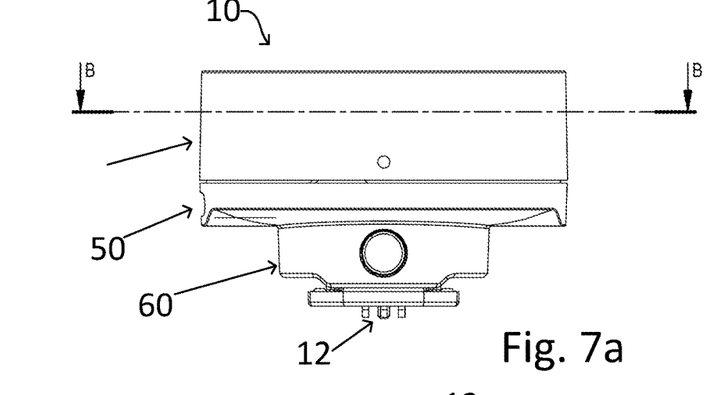
FIG. 7a is a side view of the intermediate signal transmission unit of FIG. 6
Figure 7B:
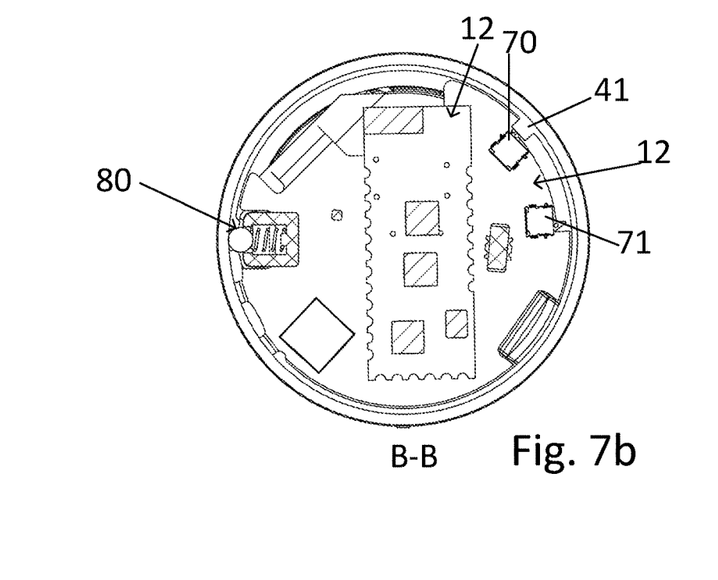
FIG. 7b shows a horizontal cross section of the intermediate signal transmission unit shown in FIG. 7a, FIG. 8 shows a vertical cross section of the intermediate signal transmission unit.
Figure 8:
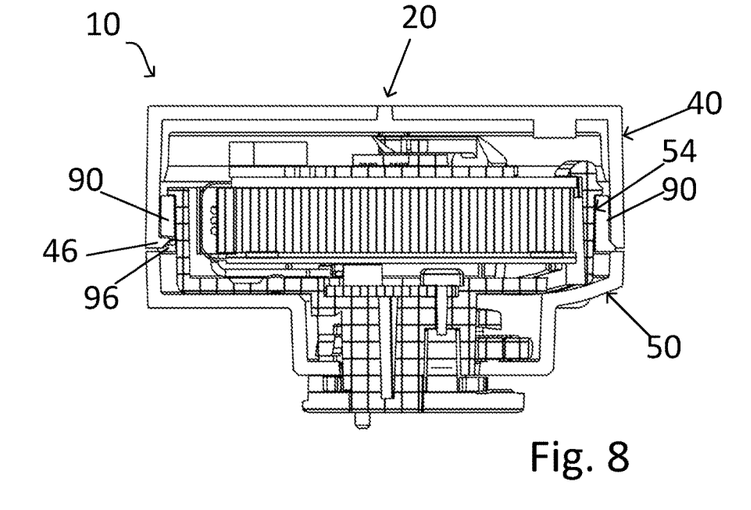

In FIGS. 6-8 is schematically illustrated an intermediate signal transmission unit 10 configured to provide wireless communication between a camera 1 and at least one remote flash device 5, and which comprises a housing 30 as described above. The unit further comprises signal transmission components 12 accommodated in the housing. The signal transmission components 12 include a signal transmitter 13 configured to send control signals to the at least one remote flash device, see also FIG. 10. The connector 60 of the housing is configured to enable bi-directional exchange of signals between the signal transmission components 12 and the intermediate signal transmission unit 10 and the camera. The signal transmission components also comprise at least one switch 70, 71 configured to control the communication between the camera and the at least one remote flash device by controlling operation modes of the intermediate signal transmission unit, and which switch 70, 71 can be controlled by means of the actuator 41 when the first housing part 40 is displaced in relation to the second housing part 50 such that when the actuator is in a first position the switch is in a first state wherein the intermediate signal transmission unit functions in a first operation mode, and when the actuator is in a second position the switch is in a second state wherein the intermediate signal transmission unit functions in a second operation mode.

Figure 10:
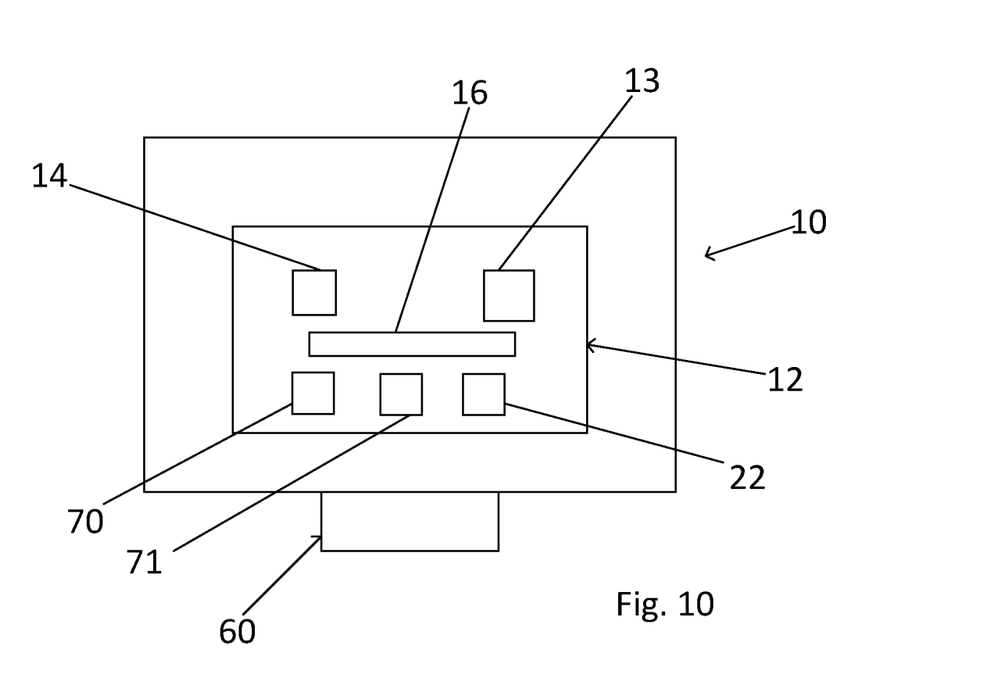
FIG. 10 shows a simplified view of an intermediate signal transmission unit with signal transmission components.

Generally, by signal transmission components is intended any electric or electronic components and circuitry that is necessary to perform the required functions of the intermediate signal transmission unit. Reference is made to FIG. 10 schematically illustrating such components including switches 70, 71, battery 14, signal transmitter 13 to flash, signal processing element 16, and optionally a controller for status indicator 22.

The signal transmission components may comprise a first switch 70 and a second switch 71, both configured to control the communication between the camera 1 and the at least one remote flash device 5. The first switch may control one operation mode of the intermediate signal transmission unit. The second switch may control another operation mode of the intermediate signal transmission unit. The first switch 70 and the second switch 71 may be controlled separately by the actuator 41 when the first housing part 40 is displaced in relation to the second housing part 50.

Generally, a first switch 70 may be configured to be in a first state corresponding to the first operation mode when the actuator 41 is in the first position. This is illustrated in FIG. 2b. A second switch 71 can be configured to be in a first state corresponding to a third operation mode when the actuator 41 is in a third position. This is illustrated in FIG. 4b. The positions are obtainable by displacing the first housing part 40 in relation to the second housing part 50, and thereby displacing the actuator 41 in relation to the switches 70, 71, as shown by the arrows P in FIGS. 2b, 3b and 4b.

Both the first switch 70 and the second switch 71 may be configured to be in a respective second disconnected state corresponding to the second operation mode when the actuator 41 is in the second position. This is illustrated in FIG. 3b.

The three operation modes may comprise one mode that is an off mode in which the intermediate signal transmission unit does not transmit any signals to the flash device, one mode that is a manual mode in which the flash device is controllable manually, and one mode that is an auto-mode in which the flash device is controlled automatically by the camera. An auto-mode may e.g. be a TTL mode.

The first operation mode controlled by the first switch 70 may be an off mode in which the intermediate signal transmission unit does not transmit any signals to the remote flash device. Preferably the intermediate signal transmission unit is also turned off such that it does not receive any signals from the camera. The third operation mode controlled by the second switch 71 may be a manual mode in which the flash device is controllable manually. The second operation mode may be an auto-mode obtained when the actuator 41 is in the second position and in which the flash device is controlled automatically by the camera. These examples can be seen in FIGS. 2a-4b. The auto-mode may be a default mode.

The intermediate signal transmission unit may comprise a re-chargeable battery 14, which is chargeable via an USB-port 52 provided in the housing 30.

The intermediate signal transmission unit 10 may comprise a status indicator 20 indicating the status of at least one function of the intermediate signal transmission unit 10, and which status indication is visible from outside of the housing 30.

Further examples and details will now be described with reference to the figures.

FIGS. 2a-4b show an example of a housing 30 having cylindrical shape. The upper, first housing part 40 is rotatable in relation to the lower, second housing part 50. Inside the housing is provided a cavity 32 in which signal transmission components of an intermediate signal transmission unit can be accommodated. FIGS. 2a-4b shows different positions of the upper, first housing part 40 in relation to the lower second housing part 50, which are obtainable by rotating the first housing part 40 in relation to the second housing part 50, as illustrated by the arrows P. The first housing part has three recesses 44 in the internal wall thereof, and each recess corresponds to a position of the actuator 41. The different positions correspond to different operation modes of an intermediate signal transmission unit, e.g. manual, auto, off. In FIGS. 2b, 3b and 4b the upper, first housing part 40 is shown in cross section and the only element of the lower, second housing part 50 that is shown is the part of the tactile indicator device 80 that is located in, or on the second housing part, namely the housing 86 for the indicator device and the spring 84. The spring loaded ball or cylinder 82 is located in a first recess 44, as shown in FIG. 2b, corresponding to a first position in which the actuator 41 by means of the protrusion 42 interacts with the first switch 70. This position represents an off mode of the intermediate signal transmission unit, as an example.

The switches 70, 71 illustrated in FIGS. 2a-4b are actually not part of the housing but are part of the signal transmission components 12 of the intermediate signal transmission unit, but are included in the figures in order to facilitate the understanding of the functions.

In FIG. 3b, a user has rotated the upper, first housing part such that the spring-loaded ball 82 has moved along the internal surface 43 of the first housing part 40 and come to rest in a second recess 44. In this position the actuator 41 does not interact with any of the switches. In this example it corresponds to an auto mode. In FIG. 4b the user has rotated the first housing even further and the spring loaded ball 82 has moved along the internal surface 43 of the first housing part 40 and come to rest in a third recess 44. The actuator 41 has thus been moved to a third position in which it interacts with a second switch 71 representing a third mode of operation, which in the example represents a manual mode. As can be seen in the figures, there may be provided stop elements 48 that limit the rotational movement of the first housing part 40 relative the second housing part 50. The stop elements 48 can be configured as members projecting from the internal wall surface of the first housing part or from the top cover part of the upper, first housing part 40. The tactile indicator will provide the user with a distinct tactile feedback when the ball enters a recess.

The interaction with between the actuator 41 and the switches 70, 71 can be implemented in different ways. For example the switches may be spring loaded. When the actuator 41 enters into contact with a switch, e.g. by a sideways motion that physically moves a switch element, the switch is activated. This can be referred to as a first state of the switch. Activation of a switch entails that the intermediate signal transmission unit enters into a different operation mode. For example, it may change from an auto mode into an off mode, as in FIGS. 2a and 2b. When the actuator is moved in the opposite direction, the switch will spring back into its previous de-activated position as shown in FIGS. 3a and 3b. This can be referred to as a second state of the switch. The corresponding course of events occurs with regard to the second switch 71 as shown in FIGS. 4a and 4b. However, an activated position of the switch here represents a manual operation mode. Naturally, the relative positions of the operation modes may be shifted and also other operation modes may be conceivable.

Figure 5A:
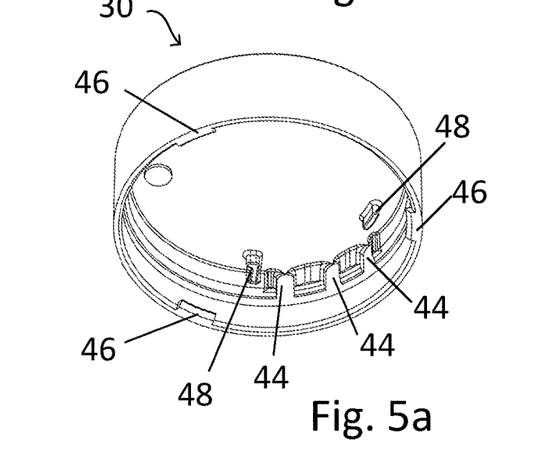
FIGS. 5a and 5b show an upper, first housing part in a perspective view from below.
Figure 5B:
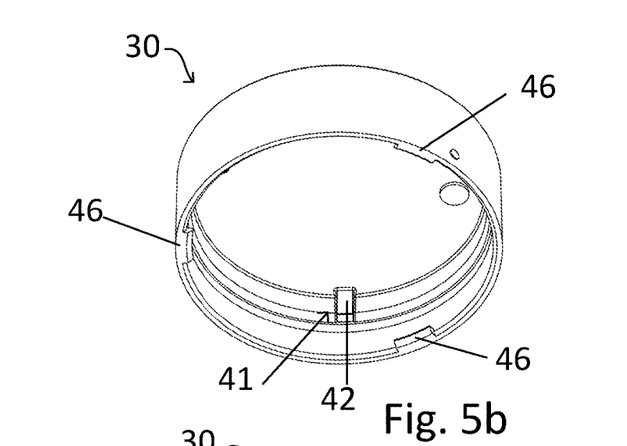

The resilient snap connectors 46 of the first housing part 40 are three in the illustrated example and the corresponding recesses 96 in the intermediate connection part 90 are also three, but the number may of course vary. In the shown example, see FIGS. 5a, 5b and 6, the snap connectors 46 are configured as elongated elements protruding from the lower edge of the first housing part 40, in a direction inwards. The corresponding recesses 96 in the intermediate connection part 90 are recesses formed in the lower edge of the intermediate connection part. This can also be seen in FIG. 8.

As mentioned, when the housing parts 40, 50 have a general cylindrical or annular shape as shown in the illustrated example, the intermediate connection 90 part may be shaped as a ring, as shown in FIG. 6. The ring is arranged in e.g. an annular groove 54 provided in the circumferential external surface of the second housing part 50, and the ring is slideable/rotatable in said groove. See also FIG. 8. The connector recesses 96 configured to receive the snap connectors 46 of the first housing part 40 are then provided in e.g. a circumferential external surface of the ring 90.

When the first housing part 40 is lowered onto the second housing part 50, the resilient snap connectors 46 will be slightly pressed outwards until they reach the recesses 96 and are able to enter and snap into the recesses. The first housing part is then locked to the intermediate connection part 90. Naturally, other designs for the snap connectors and connector recesses are possible. For example, the snap connectors may be located higher up on the internal surface of the first housing part and the connector recesses may be configured as openings in the external surface of the intermediate connection part. It may also be possible to have other designs that do not involve a snap function.

Since the ring shaped intermediate connection part 90 is locked to the first housing part 40 they can be said to form a unit. This unit has what may be called a contact surface that faces a corresponding contact surface of the second housing part 50, The contact surface of first housing part mounted on the intermediate connection part 90 is then the internal circumferential surface of the ring shaped intermediate connection part 90. This contact surface is thus rotatable and slideable along the corresponding contact surface of the groove 54 in the second housing part 50, when the first housing part is displaced in relation to the second housing part. A relative rotational movement can be obtained when gripping and rotating the upper first housing part.

Figure 9:
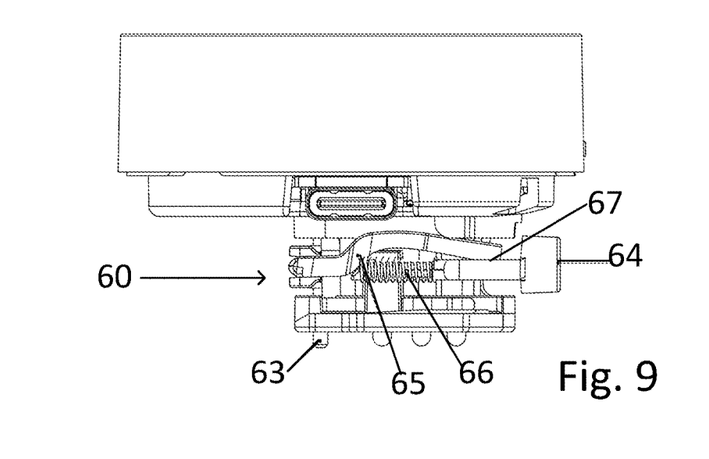
FIG. 9 shows an example of a locking mechanism.

In FIG. 9 is shown an example of a locking mechanism 60 configured to lock the housing connector 60 to the camera when connected to the camera. The locking mechanism comprises a lock pin 63 that protrudes from the connector and which is insertable into a hole in the hot shoe of the camera. The lock pin 63 is pressed down in the locking position by means of a spring-loaded lock member 65, to which it is connected. The locking mechanism further comprises a release button 64. When the release button 64 is pushed, the spring 66 is compressed by means of a stem 67 connected to the release button and this will force the lock member 65 upwards and thereby lifting the lock pin 63 into an unlocked position. The locking mechanism may of course also be implemented on other types of housings for intermediate signal transmission units and can be considered to be an invention of its own.

As mentioned above, the intermediate signal transmission unit may comprises a status indicator 20 indicating the status of at least one function of the intermediate signal transmission unit 10, and which status indication is visible from outside of the housing. This may be arranged by means of an opening, preferably covered by a transparent material, in the upper cover of the first housing part 40. The status indicator may be configured to show the status of e.g. one or more of the following functions: connection to Blue tooth, battery is fully charged, low battery level, critically low battery, charging of battery, status: ready for operation. The status indicator may be configured with a light emitter that is controlled to emit lights of different colours depending on what status information is intended to transmit to the user. The status indicator comprises a controller 22 that comprises the necessary components that controls what functions are to be represented by the status indicator, which detects the status of the functions, and emits a corresponding signal, e.g. a light, that is visible from outside of the intermediate signal transmission unit. The status indicator arrangement may of course also be implemented on other types of intermediate signal transmission units and can be considered to be an invention of its own.

This disclosure shall not be considered limited to the illustrated examples, but can be modified and altered in many ways, as realised by a person skilled in the art, without departing from the scope defined in the appended claims.

What is claimed is:

1. A housing for an intermediate signal transmission unit for wireless communication between a camera and at least one remote flash device, the housing comprising:
    a first housing part and a second housing part which are connected, said second housing part being configured to accommodate signal transmission components of the intermediate signal transmission unit, and
    a connector configured to connect the housing to a camera, said connector being arranged on the second housing part,
    wherein:
        the first housing part is displaceable in relation to the second housing part,
        the first housing part comprises at least one actuator configured to control at least one switch, said switch being part of the signal transmission components and located in the second housing part, and
        the at least one actuator is movable between at least two positions in relation to the second housing part, comprising a first position in which the actuator is configured to control the switch to be in a first state and a second position in which the actuator is configured to control the switch to be in a second state, by displacing the first housing part and the actuator in relation to the second housing part.

2. The housing according to claim 1, wherein the actuator comprises a protrusion located on an internal surface of the first housing part.

3. The housing according to claim 1, further comprising a tactile indicator device configured to give tactile feedback to a user, which tactile feedback is associated with the positions of the actuator.

4. The housing according to claim 3, wherein the tactile indicator device comprises:
   recesses located in an internal surface of the first housing part, the number of recesses corresponding to at least the number of positions of the actuator, and
   a spring loaded ball or cylinder located in or on the second housing part, configured for cooperation with the recesses, such that the ball or cylinder is pressed into a first recess by the spring, when the actuator is in a first position, and is configured to move along the internal surface of the first housing part during displacement of the first housing part in relation to the second housing part, until it reaches a second recess being located to correspond to the actuator being in a second position.

5. The housing according to claim 1, wherein the at least one actuator is movable between three positions in relation to the second housing part, wherein a third position is a position in which the actuator is configured to control a second switch.

6. The housing according to claim 1, wherein the second housing part comprises a USB-port.

7. The housing according to claim 1, further comprising an intermediate connection part movably connecting the first housing part to the second housing part and thereby the first housing configured to be displaceable in relation to the second housing part.

8. The housing according to claim 7, wherein the intermediate connection part is movably mounted to the second housing part, the first housing part comprises resilient protruding snap connectors, and the intermediate connection part comprises corresponding connector recesses configured to receive a respective snap connector upon connection of the first housing part to the second housing part.

9. The housing according to claim 1, wherein the first housing part and the second housing part have a cylindrical shape when connected and the first housing part is displaceable in relation to the second housing part by a rotational movement.

10. The housing according to claim 1, further comprising a locking mechanism configured to lock the connector of the housing to the camera when connected to the camera, and a release button for releasing the locking mechanism.

11. An intermediate signal transmission unit configured to provide wireless communication between a camera and at least one remote flash device, the unit comprising:
   a housing comprising a first housing part and a second housing part which are connected,
   a connector configured to connect the housing to a camera, said connector being arranged on the second housing part, and
   signal transmission components accommodated in the housing and including a signal transmitter configured to send control signals to the at least one remote flash device,
   wherein:
      the first housing part is displaceable in relation to the second housing part,
      the first housing part comprises at least one actuator configured to control at least one switch, said switch being part of the signal transmission components and located in the second housing part, and
   wherein:
      the connector of the housing is configured to enable bi-directional exchange of signals between the signal transmission components of the intermediate signal transmission unit and the camera, and
      the signal transmission components comprise at least one switch configured to control the communication between the camera and the at least one remote flash device by controlling operation modes of the intermediate signal transmission unit, and which switch is configured to be controlled by the actuator when the first housing part is displaced in relation to the second housing part such that when the actuator is in a first position the switch is in a first state wherein the intermediate signal transmission unit functions in a first operation mode, and when the actuator is in a second position the switch is in a second state wherein the intermediate signal transmission unit functions in a second operation mode.

12. The intermediate signal transmission unit according to claim 11, comprising a first switch configured to be in a first state corresponding to the first operation mode when the actuator is in the first position, and in a second state corresponding to the second operation mode when the actuator is in the second position, and comprising a second switch configured to be in a first state corresponding to a third operation mode when the actuator is in a third position, wherein said positions are obtainable by displacing the first housing part in relation to the second housing part.

13. The intermediate signal transmission unit according to claim 12, wherein both the first switch and the second switch are configured to be in a respective second disconnected state corresponding to the second operation mode when the actuator is in the second position.

14. The intermediate signal transmission unit according to claim 12, wherein the three operation modes comprise one mode that is an off mode in which the intermediate signal transmission unit does not transmit any signals to the flash device, one mode that is a manual mode in which the flash device is controllable manually, and one mode that is an auto-mode in which the flash device is controlled automatically by the camera.

15. The intermediate signal transmission unit according to claim 12, wherein the first operation mode is an off mode in which the intermediate signal transmission unit does not transmit any signals to the flash device, wherein the third operation mode is a manual mode in which the flash device is controllable manually, wherein the second operation mode is an auto-mode obtained when the actuator is in the second position and in which the flash device is controlled automatically by the camera.

16. The intermediate signal transmission unit according to claim 11, further comprising a re-chargeable battery, which is chargeable via a USB-port provided in the housing.

17. The intermediate signal transmission unit according to claim 11, further comprising a status indicator indicating the status of at least one function of the intermediate signal transmission unit, and which status indication is visible from outside of the housing.

* * * * *